(12) United States Patent
Miller (10) Patent No.: US 9,304,603 B2
(45) Date of Patent: Apr. 5, 2016

(54) REMOTE CONTROL USING DEPTH CAMERA

(71) Applicant: MICROSOFT TECHNOLOGY LICENSING, LLC, Redmond, WA (US)

(72) Inventor: Michael Alyn Miller, Redlands, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 359 days.

(21) Appl. No.: 13/674,742

(22) Filed: Nov. 12, 2012

(65) Prior Publication Data

US 2014/0132498 A1 May 15, 2014

(51) Int. Cl.
G06F 3/033 (2013.01)
G06F 3/03 (2006.01)
G08C 23/04 (2006.01)

(52) U.S. Cl.
CPC .............. *G06F 3/0304* (2013.01); *G08C 23/04* (2013.01); *G08C 2201/40* (2013.01)

(58) Field of Classification Search
USPC .................... 345/156, 175, 158, 650; 396/59; 463/37; 348/77, 143, 164
See application file for complete search history.

(56) References Cited

U.S. PATENT DOCUMENTS 6,466,742 B1 * 10/2002 Baron .............................. 396/59
8,558,759 B1 * 10/2013 Prada Gomez ......... G06F 3/017 345/156
8,558,873 B2 * 10/2013 McEldowney ..... G01B 11/2513 348/46
8,659,658 B2 * 2/2014 Vassigh ................... G06F 3/011 348/143
8,670,029 B2 * 3/2014 McEldowney ....... G02B 5/1895 348/121
8,933,884 B2 * 1/2015 Markovic ................ A63F 13/06 345/158
9,024,842 B1 * 5/2015 Prada Gomez ......... G06F 3/017 345/156
2004/0108940 A1 6/2004 Witkow et al.
2007/0015579 A1 * 1/2007 Masaki et al. .................. 463/37
2010/0194762 A1 8/2010 Latta et al.
2010/0328267 A1 * 12/2010 Chen ............................. 345/175
2011/0117850 A1 5/2011 Fung et al.
2011/0209177 A1 8/2011 Sela et al.
2011/0237324 A1 * 9/2011 Clavin ............... G06K 9/00369 463/29
2011/0246437 A1 10/2011 Kollenkark et al.
2012/0082461 A1 4/2012 Meyer et al.
2012/0144299 A1 6/2012 Patel et al.

OTHER PUBLICATIONS

ISA European Patent Office, International Search Report & Written Opinion for Patent Application No. PCT/US2013/069515, Feb. 11, 2014, 9 pages.
Meng, et al., "Can Smartphone Sensors Enhance Kinect Experience?", Retrieved at <<http://www.cse.sc.edu/~srihari/pubs/Kinect_MobiHoc12.pdf>>, In Proceedings of the thirteenth ACM international symposium on Mobile Ad Hoc Networking and Computing, Jun. 11, 2012, pp. 2.

(Continued)

*Primary Examiner* — Thuy Pardo
(74) *Attorney, Agent, or Firm* — Aaron Chatterjee; Judy Yee; Micky Minhas (57) ABSTRACT

Embodiments for using a depth camera to emit remote control signals are provided. In one example embodiment, a depth camera includes an infrared light to emit infrared light at a physical space, an infrared camera to receive infrared light from the physical space, an imaging interface to output a depth map derived from the infrared light, and a control interface to receive an instruction indicating a remote control signal to emit from the infrared light.

16 Claims, 7 Drawing Sheets

(56) References Cited

OTHER PUBLICATIONS

Ionescu, Daniel, "8 More New Uses for Your Old Smartphone", Retrieved at <<http://www.pcworld.com/article/254853/8_more_new_uses_for_your_old_smartphone.html>>, May 3, 2012, pp. 3.

"Andy Robertson: The future of television has arrived and it is not remotely like anything we've ever seen", Retrieved at <<http://www.independent.ie/opinion/comment/andy-robertson-the-future-of-television-has-arrived-and-it-is-not-remotely-like-anything-weve-ever-seen-3159896.html>>, Jul. 5, 2012, pp. 2.

* cited by examiner

REMOTE CONTROL USING DEPTH CAMERA

BACKGROUND

The advent of mobile computing devices has provided users with the opportunity to wirelessly communicate with a variety of external devices. However, many home entertainment devices are configured to be controlled via infrared signals that many mobile computing devices are incapable of emitting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for using a depth camera to emit remote control signals are provided. In one example embodiment, a depth camera includes an infrared light to emit infrared light at a physical space, an infrared camera to receive infrared light from the physical space, an imaging interface to output a depth map derived from the infrared light, and a control interface to receive an instruction indicating a remote control signal to emit from the infrared light.

DETAILED DESCRIPTION

A user may desire to control one or more components of a home entertainment system with his or her mobile computing device (e.g., smart phone), in order to simplify the number of control devices used by the user, and/or to expand the capabilities of the control device. For example, a mobile computing device may allow the user to control a device located in a different room. However, some components are configured with infrared sensors to detect an infrared signal sent from a control device, and cannot be wirelessly controlled via the non-infrared communication channels typically used by mobile computing devices. To control an infrared-receiving device, a mobile computing device may send a command to a computing system using a non-infrared communication channel. The computing system may be coupled to a depth camera configured to emit infrared light to image a physical space. The computing system may send an instruction to the depth camera to emit an infrared signal configured to cause the infrared-receiving device to achieve an objective (e.g., change a channel, increase the volume, begin recording, etc.). In this way, the mobile computing device may act as an input device to the infrared-receiving device.

Figure 1:
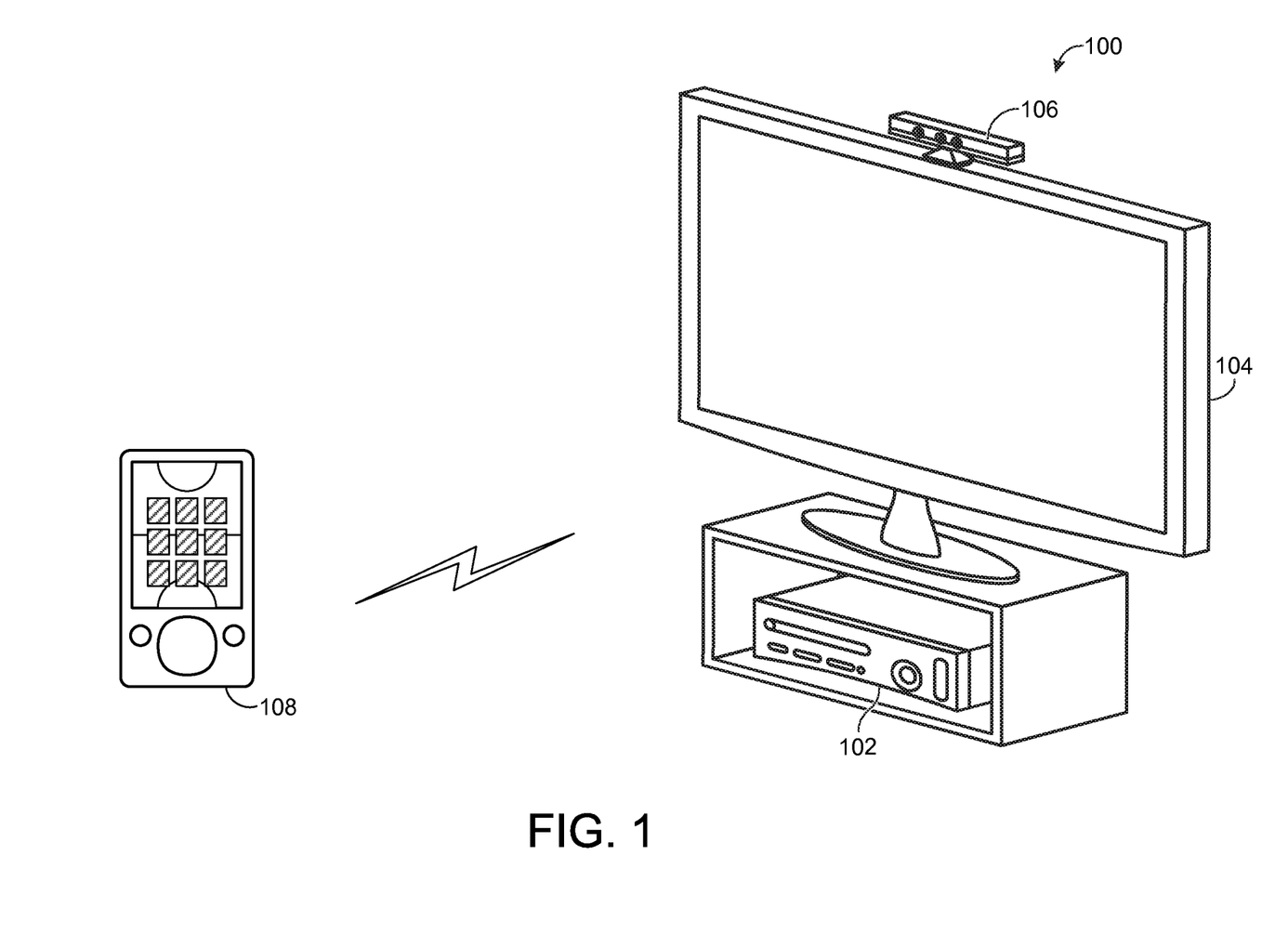
FIG. 1 shows an example control environment including an entertainment system configured to receive commands from a mobile computing device and a depth camera configured to emit infrared signals.

FIG. 1 shows a non-limiting example of a control environment 100. In particular, FIG. 1 shows an entertainment system 102 that may be used to play a variety of different games, play one or more different media types, and/or control or manipulate non-game applications and/or operating systems. FIG. 1 also shows a display device 104 such as a television or a computer monitor, which may be used to present media content, game visuals, etc., to users. As one example, display device 104 may be used to visually present media content received by entertainment system 102. The control environment 100 may include a capture device, such as a depth camera 106 that visually monitors or tracks objects and users within an observed scene.

FIG. 1 also shows a non-limiting example of a mobile computing device 108. Mobile computing device 108 is configured to wirelessly communicate with entertainment system 102 via a non-infrared communication channel (e.g., IEEE 802.15.x, IEEE 802.11.x, proprietary radio signal, etc.) in order to control one or more actions of entertainment system 102. Thus, mobile computing device 108 may be configured as an input device for entertainment system 102 as well as being configured as a computing and/or communication device. For example, mobile computing device 108 may be configured to communicate via two-way radio telecommunications over a cellular network. Further, mobile computing device 108 may additionally be configured to send and/or receive text communications (e.g., SMS messages, email, etc.). In addition, as elaborated further below, mobile computing device 108 may control the actions of an external device configured to receive infrared control signals (such as an infrared signal sent from a remote control), via entertainment system 102 and depth camera 106.

Display device 104 may be operatively connected to entertainment system 102 via a display output of the entertainment system. For example, entertainment system 102 may include an HDMI or other suitable wired or wireless display output. Display device 104 may receive video content from entertainment system 102, and/or it may include a separate receiver configured to receive video content directly from a content provider. While display device 104 is configured to receive media content for presentation from entertainment system 102, one or more aspects of display device 104 may be controlled independently of entertainment system 102. As an example, control of display device 104 volume, power, display configurations, etc., may be controlled directly through display device 104, e.g., via a native remote control.

The depth camera 106 may be operatively connected to the entertainment system 102 via one or more interfaces. As a non-limiting example, the entertainment system 102 may include a universal serial bus to which the depth camera 106 may be connected. Depth camera 106 may be used to recognize, analyze, and/or track one or more human subjects and/or objects within a physical space. Depth camera 106 may include an infrared light to project infrared light onto the physical space and a depth camera configured to receive infrared light.

In order to image objects within the physical space, the infrared light may emit infrared light that is reflected off objects in the physical space and received by the depth camera. Based on the received infrared light, a depth map of the physical space may be compiled. Depth camera 106 may output the depth map derived from the infrared light to entertainment system 102, where it may be used to create a representation of the physical space imaged by the depth camera. The depth camera may also be used to recognize objects in the physical space, monitor movement of one or more users, perform gesture recognition, etc. Virtually any depth finding technology may be used without departing from the scope of this disclosure. Example depth finding technologies are discussed in more detail with reference to FIG. 7.

As explained above, mobile computing device 108 may be configured to wirelessly control one or more aspects of entertainment system 102. However, other entertainment devices present in control environment 100 may be configured to be remotely controlled only via an infrared communication channel. For example, display device 104 and/or other devices not depicted in FIG. 1 may be wirelessly controlled via an infrared signal sent from a native remote control device. As mobile computing devices typically lack an infrared emitter, they are usually not configured to wirelessly control such devices.

Display device 104 is provided as a non-limiting example of a device configured to be controlled with infrared signals. Display device 104 is intended to represent any number of different devices that do not receive native command signals from the mobile computing device but instead receive infrared command signals. Other such devices may include, but are not limited to, audio receivers, set top boxes, home automation components, and recording and/or playback devices. It is to be understood that the below described control strategies may be performed on any suitable device, and display device 104 is only one suitable example.

According to embodiments disclosed herein, mobile computing device 108 may send a command to entertainment system 102 that causes depth camera 106 to emit an infrared signal to control one or more external devices within control environment 100. For example, to wirelessly control display device 104, entertainment system 102 may receive a command from mobile computing device 108 and, in response to the received command, send an instruction to depth camera 106 to emit a remote control signal usable by display device 104. Thus, mobile computing device 108 may wirelessly send a command to entertainment system 102, which in turn sends an instruction to depth camera 106. The instruction may cause the infrared light in depth camera 106 to emit a specific infrared light signal to cause display device 104 to perform an action specified by the command sent by mobile computing device 108. In this way, mobile computing device 108 may act as input device for display device 104, even though display device 104 is configured to receive infrared wireless communication signals, while mobile computing device 108 is configured to send non-infrared wireless communication signals.

FIG. 1 depicts depth camera 106 and display device 104 as being positioned on substantially the same plane. That is, depth camera 106 is not directly pointed at display device 104. However, the infrared light signal emitted from depth camera 106 may reflect off surfaces within control environment 100 to reach display device 104 or other external devices. In this way, depth camera 106 need not be directly pointed at the device which it is configured to control.

Entertainment system 102 may be configured to communicate with one or more remote computing devices, not shown in FIG. 1. For example, entertainment system 102 may receive video content directly from a broadcaster, third party media delivery service, or other content provider. Entertainment system 102 may also communicate with one or more remote services via the Internet or another network, for example in order to obtain the information regarding the infrared control signals to send to depth camera 106.

While the embodiment depicted in FIG. 1 shows entertainment system 102, display device 104, and depth camera 106 as separate elements, in some embodiments one or more of the elements may be integrated into a common device. For example, entertainment system 102 and depth camera 106 may be integrated in a common device.

Figure 2:
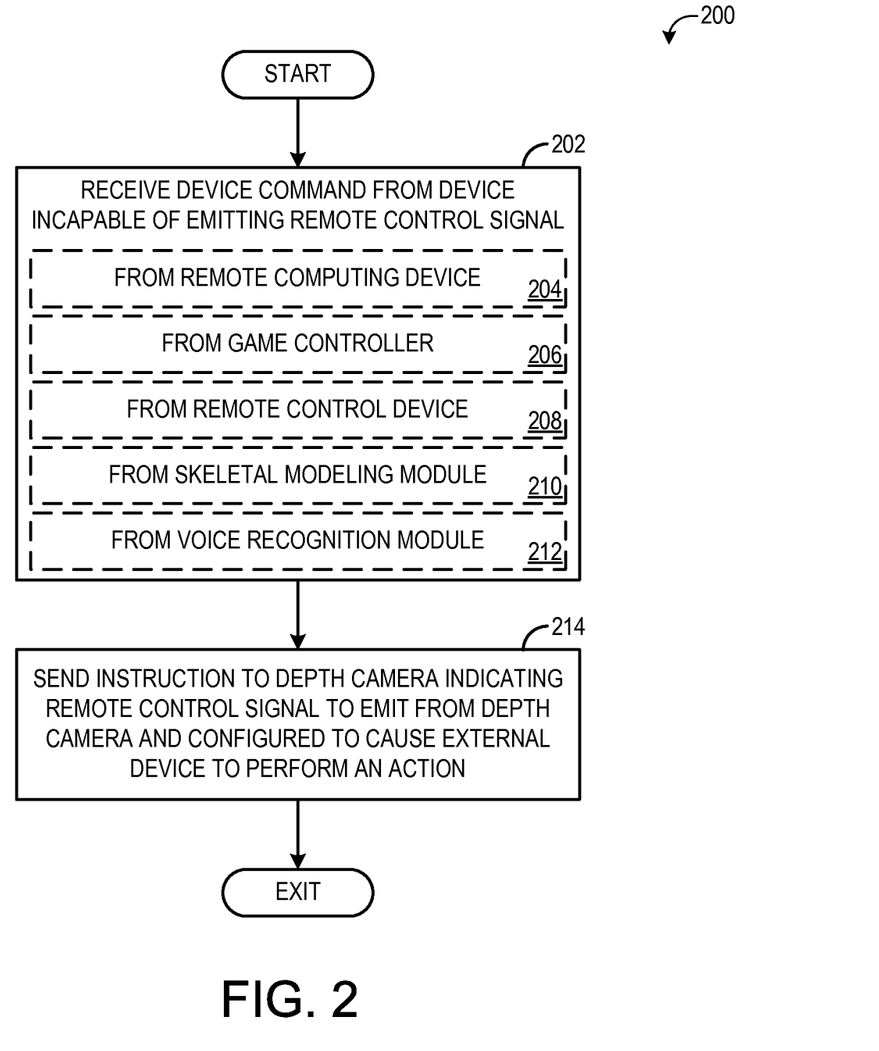
FIG. 2 is a flow chart illustrating a method for using a non-infrared emitting control device and a depth camera to control an external device according to an embodiment of the present disclosure.

Turning now to FIG. 2, a method 200 for using a non-infrared emitting control device (e.g., mobile computing device 108 of FIG. 1) as a universal remote control is depicted. For example, method 200 may be carried out by an entertainment system, such as entertainment system 102, in order to control an external device (e.g., display device 104 of FIG. 1). The external device may be controlled via a depth camera (e.g., depth camera 106 of FIG. 1), in response to commands received from the non-infrared emitting control device. Method 200 includes, at 202, receiving a device command from a device incapable of emitting a remote control signal. As used herein, "incapable of emitting a remote control signal" refers to devices incapable of emitting a remote control signal compatible with the desired external device. This includes not only devices that lack an infrared emitter (such as mobile computing device 108) but may also include devices that emit a non-compatible infrared signal.

The device command may indicate an action that is to be performed by an external device. The device command may be received from a remote computing device at 204. The remote computing device may include a mobile computing device (e.g., smart phone), tablet computer, laptop computer, desktop computer, or other computing device separate from the computing system.

Other devices and mechanisms are also possible for communicating the device command to the entertainment system. As an example, indicated at 206, the device command may be received from a hand-held game controller. The hand-held game controller may communicate with the entertainment system in order to send user input to the entertainment system, to control movements of a player in a game, for example. In another example, at 208, the device command may be received from a remote control configured to emit a non-compatible signal. The remote control may be configured to send a signal (which may be an infrared signal) usable by a different device than the external device. Additional devices or mechanisms are also possible, such as a laptop computer, desktop computer, tablet, web site, etc.

The entertainment system may be configured to detect the non-compatible signal directly or via the depth camera. To detect the non-compatible signal directly, the entertainment system may include an infrared or other signal receiver configured to receive the non-compatible signal. To detect the signal indirectly, via the depth camera for example, the depth camera may be configured to detect the non-compatible signal and send information indicating the non-compatible signal to the entertainment system.

While examples presented above include devices capable of sending wireless or wired communication directly to the entertainment system, the entertainment system may also be configured to interpret natural user input received via a depth camera or a microphone. For example, the device command may be received from a skeletal modeling module at 210. The skeletal modeling module may be configured to recognize natural user input gestures physically performed by a user. In one example, the natural user input may be imaged by the depth camera. Further, as indicated at 212, the device command may be received from a voice recognition module configured to recognize voice commands issued by a user, via a microphone coupled to the depth camera, entertainment system, or other device. Additional information regarding the skeletal modeling module and voice recognition module is presented below with respect to FIGS. 3 and 7.

Next, at 214, method 200 includes sending an instruction to the depth camera indicating the remote control signal to emit from the depth camera. The remote control signal may be configured to cause the external device to perform an action associated with the device command. As one non-limiting example, the device command may be a command to increase the volume of a display device, and the instruction may cause the depth camera to emit a specific infrared remote control signal that the display device recognizes as a signal to increase its volume. As a result, the volume on the display device may increase.

The instruction sent to the depth camera may be any suitable instruction for the depth camera to emit a specific infrared signal. During standard imaging, the depth camera may emit a first pattern of infrared light in order to determine the depth of objects within the physical space being imaged. The instruction may command the depth camera to temporarily suspend emitting the first light pattern for imaging to mimic the remote control signal that would be emitted from a native remote control configured to control the display device. In another example, the instruction may command the depth camera to continue to emit the first light pattern for imaging, and emit the remote control signal along with the imaging light.

While FIG. 2 depicts an example of sending a device command from a mobile computing device or other mechanism to an entertainment system in order to cause a depth camera to emit an infrared signal to control an external device, in some embodiments it may be possible for the entertainment system to instruct the depth camera to emit the infrared signal without receiving the device command. For example, the entertainment system may be programmed with a schedule to automatically instruct the depth camera to emit infrared signals in order to record a video content item to a digital video recorder. In this way, the video content item may be automatically recorded according to the program on the entertainment system rather than in response to a device command initiated by a user.

Figure 3:
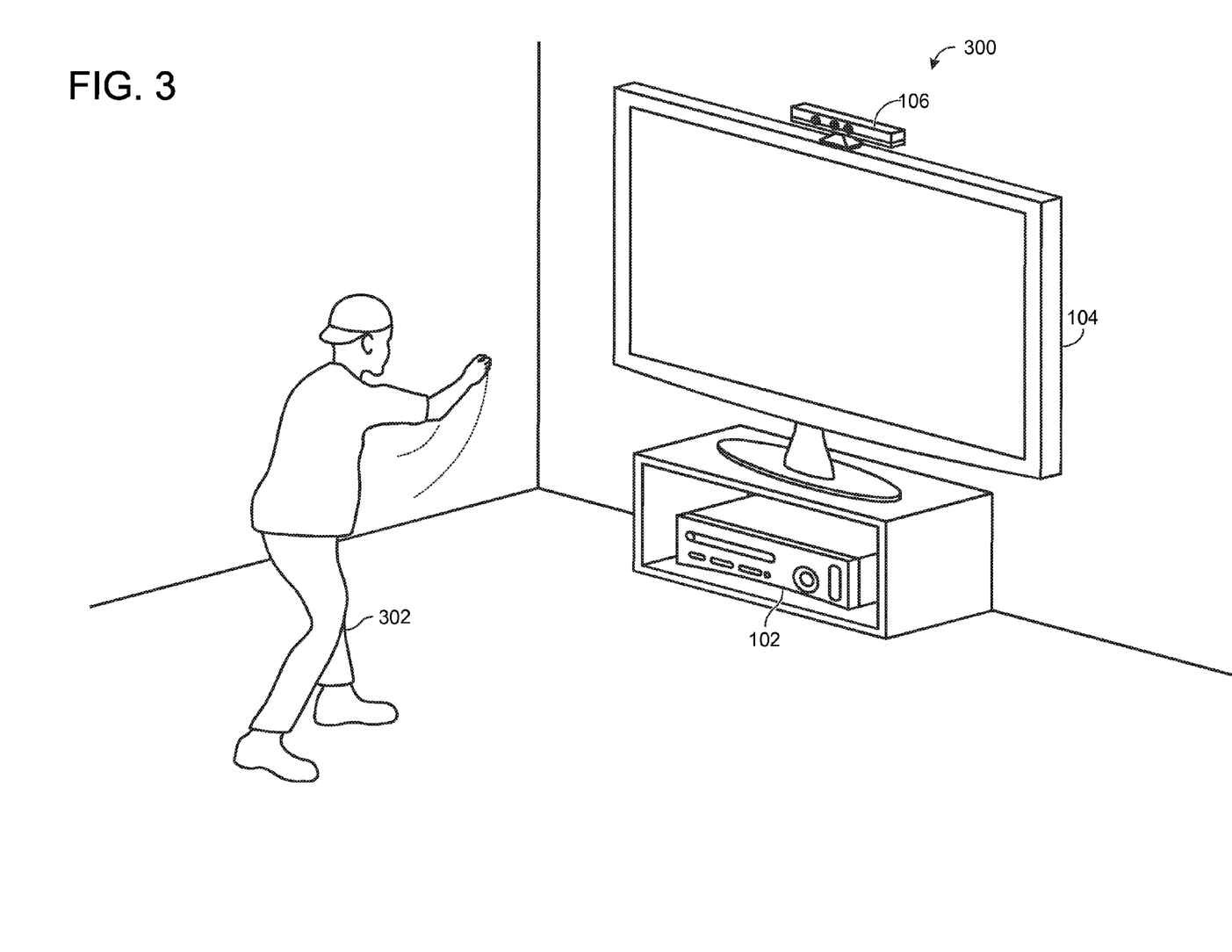
FIG. 3 is a diagram illustrating a control sequence according to an embodiment of the present disclosure.

As introduced above, the device command may be determined from natural user input. FIG. 3 illustrates a control environment 300 that may be used to detect natural user input. Control environment 300 may include similar elements as the environment of FIG. 1. For example, control environment 300 also includes entertainment system 102, display device 104, and depth camera 106. However, a user 302 is also illustrated in control environment 300. FIG. 3 shows a scenario in which depth camera 106 tracks user 302 so that the movements of user 302 may be interpreted by entertainment system 102. In particular, the movements of user 302 are interpreted as controls that can be used to emit remote control signals from depth camera 106 to display device 104. In other words, user 302 may use his movements to control display device 104 and/or other devices that are not natively configured to be controlled responsive to user movements, gestures, and/or voice commands.

In order to track and interpret movements and/or voice commands of user 302, observation data may be collected by depth camera 106. As explained previously, depth camera 106 may include one or more sensors that are configured to observe a human subject, such as user 302. For example, the depth camera may include an infrared light camera, a visible light (e.g., color) camera, and a microphone.

The depth camera may determine, for each pixel of the depth camera, the depth of a surface in the observed scene relative to the depth camera. A three-dimensional x/y/z coordinate may be recorded for every pixel of the depth camera. The three-dimensional x/y/z coordinates for all of the pixels collectively constitute a depth map. The three-dimensional x/y/z coordinates may be determined in any suitable manner without departing from the scope of this disclosure. Example depth finding technologies are discussed in more detail with reference to FIG. 7.

The visible-light camera may determine, for each pixel of the visible-light camera, the relative light intensity of a surface in the observed scene for one or more light channels (e.g., red, green, blue, grayscale, etc.). Red/green/blue color values may be recorded for every pixel of the visible-light camera. The red/green/blue color values for all of the pixels collectively constitute a digital color image. The red/green/blue color values may be determined in any suitable manner without departing from the scope of this disclosure. Example color imaging technologies are discussed in more detail with reference to FIG. 7.

One or more microphones may determine directional and/or non-directional sounds coming from user 302 and/or other sources. Audio data may be recorded by a microphone of depth camera 106. Such audio data may be determined in any suitable manner without departing from the scope of this disclosure. Example sound recording technologies are discussed in more detail with reference to FIG. 7.

The collected data may take the form of virtually any suitable data structure(s), including but not limited to one or more matrices that include a three-dimensional x/y/z coordinate for every pixel imaged by the depth camera, red/green/blue color values for every pixel imaged by the visible-light camera, and/or time resolved digital audio data. User 302 may be continuously observed and modeled (e.g., at 30 frames per second). Accordingly, data may be collected for each such observed frame. The collected data may be made available via one or more Application Programming Interfaces (APIs) and/or further analyzed as described below.

The depth camera 106, entertainment system 102, and/or a remote service optionally may analyze the depth map to distinguish human subjects and/or other targets that are to be tracked from non-target elements in the observed depth map. Each pixel of the depth map may be assigned a user index that identifies that pixel as imaging a particular target or non-target element. As an example, pixels corresponding to a first user can be assigned a user index equal to one, pixels corresponding to a second user can be assigned a user index equal to two, and pixels that do not correspond to a target user can be assigned a user index equal to zero. Such user indices may be determined, assigned, and saved in any suitable manner without departing from the scope of this disclosure.

The depth camera 106, entertainment system 102, and/or remote service optionally may further analyze the pixels of the depth map of user 302 in order to determine what part of the user's body each such pixel is likely to image. A variety of different body-part assignment techniques can be used to assess which part of the user's body a particular pixel is likely to image. Each pixel of the depth map with an appropriate user index may be assigned a body part index. The body part index may include a discrete identifier, confidence value, and/or body part probability distribution indicating the body part, or parts, to which that pixel is likely to image. Body part indices may be determined, assigned, and saved in any suitable manner without departing from the scope of this disclosure.

A virtual skeleton may serve as a machine-readable representation of user 302. The virtual skeleton may include a suitable number of virtual joints. The various skeletal joints may correspond to actual joints of user 302, centroids of the user's body parts, terminal ends of the user's extremities, and/or points without a direct anatomical link to the user. Each joint may have at least three degrees of freedom (e.g., world space x, y, z). As such, each joint of the virtual skeleton is defined with a three-dimensional position. The position of the joints may be defined relative to any suitable origin. As one example, the depth camera may serve as the origin, and all joint positions are defined relative to the depth camera. Joints may be defined with a three-dimensional position in any suitable manner without departing from the scope of this disclosure.

A variety of techniques may be used to determine the three-dimensional position of each joint. Skeletal fitting techniques may use depth information, color information, body part information, and/or prior trained anatomical and kinetic information to deduce one or more skeleton(s) that closely model a human subject. As one non-limiting example, the above described body part indices may be used to find a three-dimensional position of each skeletal joint.

A joint orientation may be used to further define one or more of the virtual joints. Whereas joint positions may describe the position of joints and virtual bones that span between joints, joint orientations may describe the orientation of such joints and virtual bones at their respective positions. As an example, the orientation of a wrist joint may be used to describe if a hand located at a given position is facing up or down.

Joint orientations may be encoded, for example, in one or more normalized, three-dimensional orientation vector(s). The orientation vector(s) may provide the orientation of a joint relative to the depth camera or another reference (e.g., another joint). Furthermore, the orientation vector(s) may be defined in terms of a world space coordinate system or another suitable coordinate system (e.g., the coordinate system of another joint). Joint orientations also may be encoded via other means. As non-limiting examples, quaternions and/or Euler angles may be used to encode joint orientations.

Joint positions, orientations, and/or other information may be encoded in any suitable data structure(s). Furthermore, the position, orientation, and/or other parameters associated with any particular joint may be made available via one or more APIs.

The virtual skeleton may optionally include a plurality of virtual bones. The various skeletal bones may extend from one skeletal joint to another and may correspond to actual bones, limbs, or portions of bones and/or limbs of the user. The joint orientations discussed herein may be applied to these bones. For example, an elbow orientation may be used to define a forearm orientation.

The virtual skeleton may be used to recognize one or more gestures performed by user 302. As a non-limiting example, a particular user gesture may correspond to a "change channel up" command, and the virtual skeleton may be analyzed over one or more frames to determine if that gesture has been performed.

The recognized gestures may be interpreted by entertainment system 102 in order to send one or more instructions to depth camera 106 to cause the infrared light of depth camera 106 to emit a remote control signal to control an external device, such as display device 104. For example, responsive to recognizing the "change channel up" gesture, entertainment system 102 may instruct depth camera 106 to emit the infrared signal that causes display device 104 to change the channel up. It is to be understood, however, that a virtual skeleton may be used for additional and/or alternative purposes without departing from the scope of this disclosure.

Figure 4:
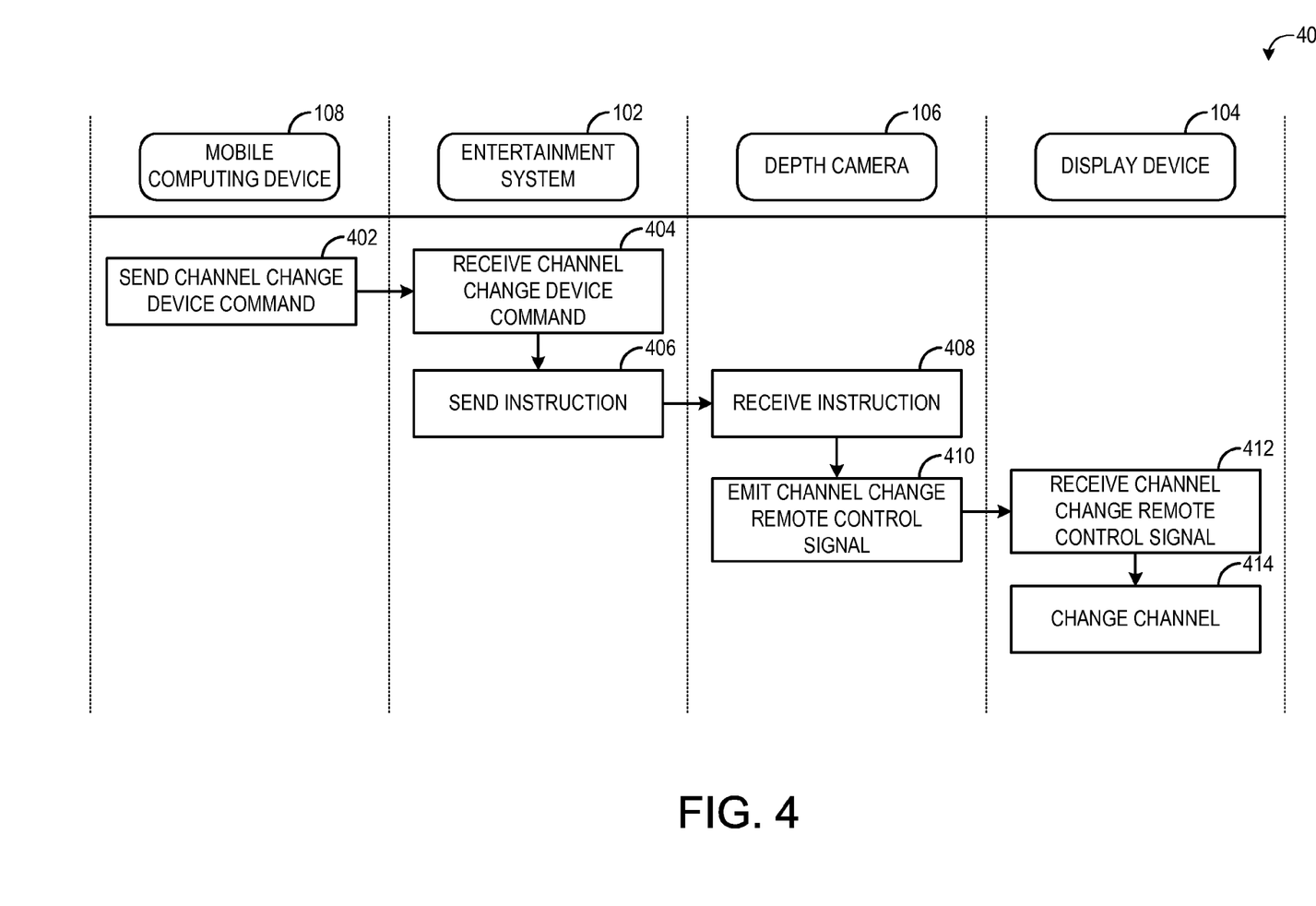
FIG. 4 shows another example control environment including an entertainment system configured to receive commands from a user.

FIG. 4 illustrates a non-limiting example control sequence 400 of commands and information among the various devices of control environment 100 during the execution of method 200. Specifically, in the example illustrated in FIG. 4, mobile computing device 108 sends a command to perform a channel change operation on display device 104. First, at 402, mobile computing device 108 sends the channel change device command to entertainment system 102. At 404, entertainment system 102 receives the channel change device command. At 406, entertainment system 102 sends an instruction to depth camera 106. The instruction may specify the remote control signal that depth camera 106 is to emit. At 408, depth camera 106 receives the instruction, and at 410, depth camera 106 emits a channel change remote control signal. At 412, display device 104 receives the channel change remote control signal. At 414, the display device performs a channel change operation.

While a channel change is provided as an example in the illustrated control sequence, any controllable aspect of the display device (or other device) may be controlled in this manner. Also, while the device command is delivered to the entertainment system via the mobile computing device, user gestures, voice commands, game controllers, etc. may instead be used to deliver the device command.

Entertainment system 102 and/or mobile computing device 108 may be configured to obtain and/or store the specific remote control signals for a particular external device. These remote control signals may be obtained via a remote service, via a network for example. In another example, the remote control signals may be manually programmed by a user. Additionally, as described below with respect to FIG. 5, entertainment system 102 may be configured to detect a native remote control signal sent to an external device from a native remote control, and determine an objective of that remote control signal (e.g., what action is performed by the external device upon receiving the remote control signal). Based on the determined objective and the detected remote control signal, entertainment system 102 may recognize instructions to send to depth camera 106 to emit the correct remote control signal, and/or may send information to mobile computing device 108 to enable mobile computing device to send the correct device command to entertainment system 102.

Figure 5:
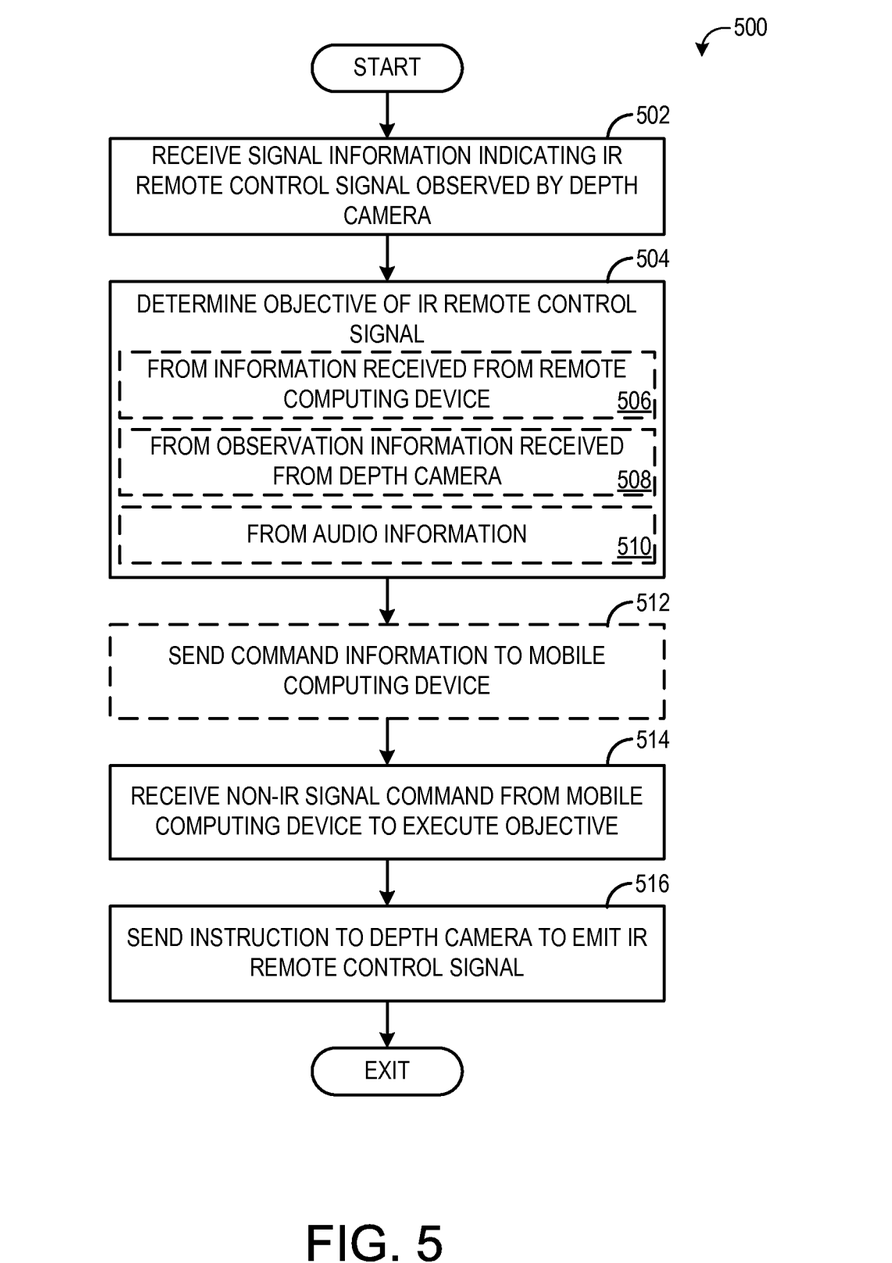
FIG. 5 is a flow chart illustrating a method for using a mobile computing device and a depth camera to control an external device according to an embodiment of the present disclosure.

Thus, turning to FIG. 5, a method 500 for learning remote control signals for controlling an external device is illustrated. Method 500 may be carried out by an entertainment system (e.g., entertainment system 102 of FIG. 1). Method 500 includes, at 502, receiving signal information indicating an infrared remote control signal observed by a depth camera. The infrared remote control signal may be emitted from a native remote control device to an associated external device, such as display device 104, controlled by the native remote control. The depth camera, such as depth camera 106, may also receive the remote control signal. The depth camera may be configured to detect the specific infrared signal sent by the native remote control to the external device, and may send information to the entertainment system or other computing system relating to the remote control signal.

At 504, the objective of the infrared remote control signal is determined. The objective of the remote control signal may be the action performed by the external device upon receiving the remote control signal. The objective may be determined from information received from a remote computing device, such as a remote service, as indicated at 506. For example, upon receiving the signal information of the remote control signal, the entertainment system may communicate identifying characteristics of the remote control signal to a remote service. The remote service may use the identifying characteristics to lookup the objective (e.g., change channel up). Further, the remote service may communicate the objective associated with the remote control signal to the entertainment system. Additionally, in some embodiments, the remote service may also send other objectives associated with other remote control signals. As a non-limiting example, if the change channel up command corresponds to a particular model of display device, all remote control signals corresponding to that model of display device may be sent.

The objective of the remote control signal may additionally or alternatively be determined from observation information received from the depth camera at 508. The observation information may include imaging information obtained from the depth camera indicative of an action performed by the external device upon receiving the infrared remote control signal. For example, the depth camera may collect imaging information that indicates a channel was changed on the display device, and thus the entertainment system may determine that the objective of the remote control signal is to change the channel of the display device.

The objective of the remote control signal may further be determined from received audio information at 510. The audio information may be indicative of an action performed by the external device upon receiving the infrared remote control signal. As explained previously, the depth camera and/or entertainment system may include a microphone to detect sounds. The collected audio information may then be used to determine the objective. For example, a volume up command may be determined from increasing volume levels. While not depicted in FIG. 5, other mechanisms for determining the objective are possible, such as the user entering the objective. For example, mobile computing device 108 may prompt the user to enter the objective.

At 512, method 500 optionally includes sending information regarding a device command or commands to a mobile computing device, such as mobile computing device 108. Upon determining the objective of the detected remote control signal, the entertainment system optionally may send information to the mobile computing device indicative of the remote control signal and objective. This information optionally may be stored by mobile computing device to allow the mobile computing device to subsequently control the external device.

At 514, a non-infrared signal command to execute the objective is received from the mobile computing device. The mobile computing device may be incapable of emitting an infrared remote control signal that can natively control the intended device. The non-infrared signal command may be received wirelessly or via a wired connection. At 516, method 500 includes sending an instruction to the depth camera to emit the infrared remote control signal. The remote control signal emitted by the depth camera may mimic the native remote control signal emitted by the native remote control device, and may cause the external device to perform an action associated with the remote control signal.

Figure 6:
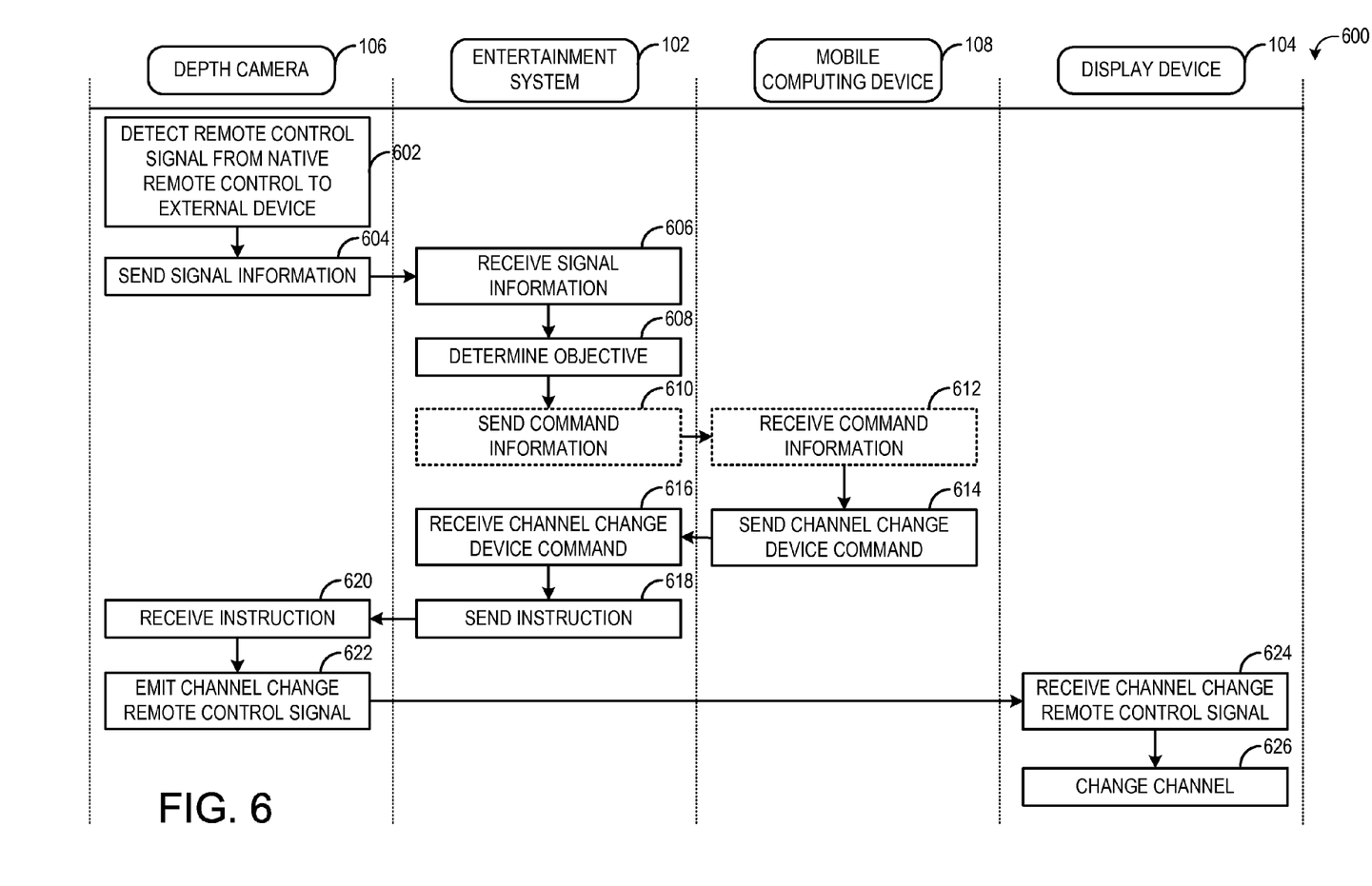
FIG. 6 is a diagram illustrating a control sequence according to another embodiment of the present disclosure.

The flow of commands, information, and actions performed during the execution of method 500 is depicted in control sequence 600 of FIG. 6. At 602, depth camera 106 detects the remote control signal sent from the native remote control to the external device. At 604, the depth camera sends the detected signal information to the entertainment system 102. The signal information is received by entertainment system at 606, and after receiving the signal information, the entertainment system determines the objective of the remote control signal at 608. As optional steps, the entertainment system may send command information to the mobile computing device 108 at 610, and the mobile computing device may receive command information at 612.

At 614, the mobile computing device sends a device command (a channel change command is illustrated in FIG. 6) to the entertainment system. The entertainment system receives the command at 616 and sends an instruction indicating the remote control signal to the depth camera at 618. The depth camera receives the instruction at 620 and emits the channel change remote control signal at 622. At 624, the channel change remote control signal is received by the display device 104. At 626, the display device performs a channel change operation.

In some embodiments, the methods and processes described above may be tied to a computing system of one or more computing devices. In particular, such methods and processes may be implemented as a computer-application program or service, an application-programming interface (API), a library, and/or other computer-program product.

Figure 7:
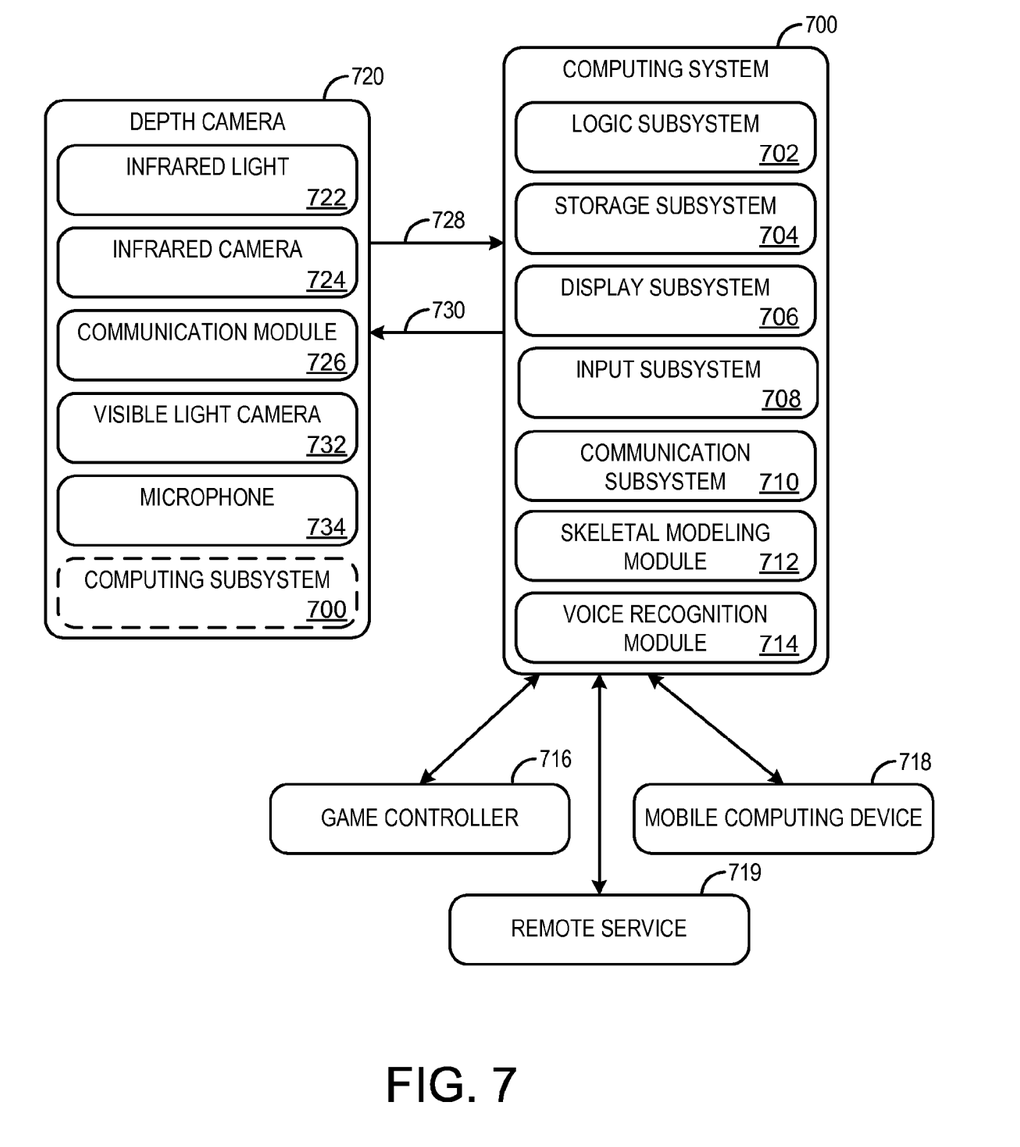
FIG. 7 shows a non-limiting example of a computing system in accordance with various embodiments of the present disclosure.

FIG. 7 schematically shows a non-limiting embodiment of a computing system 700 that can enact one or more of the methods and processes described above. Entertainment system 102 is one non-limiting example of computing system 700. Computing system 700 is shown in simplified form. It will be understood that virtually any computer architecture may be used without departing from the scope of this disclosure. In different embodiments, computing system 700 may take the form of a home-entertainment computer, gaming device, mobile computing device, mobile communication device (e.g., smart phone), mainframe computer, server computer, desktop computer, laptop computer, tablet computer, network computing device, etc.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 704 includes one or more physical, non-transitory, devices configured to hold data and/or instructions executable by the logic subsystem to implement the methods and processes described herein. When such methods and processes are implemented, the state of storage subsystem 704 may be transformed—e.g., to hold different data.

Storage subsystem 704 may include removable media and/or built-in devices. Storage subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 702 and of storage subsystem 704 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage subsystem 704. This visual representation may take the form of a graphical user interface (GUI). As the herein described methods and processes change the data held by the storage subsystem, and thus transform the state of the storage subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as hand-held game controller 716, mobile computing device 718, and/or other devices not depicted in FIG. 7, such as a keyboard, mouse, or touch screen. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera 720 for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices, such as mobile computing device 718 and/or a remote service 719 configured to provide remote control commands. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Further, computing system 700 may include a skeletal modeling module 712 configured to receive imaging information from a depth camera 720 (described below) and identify and/or interpret one or more postures and gestures performed by a user. Computing system 700 may also include a voice recognition module 714 to identify and/or interpret one or more voice commands issued by the user detected via a microphone (coupled to computing system 700 or the depth camera). While skeletal modeling module 712 and voice recognition module 714 are depicted as being integrated within computing system 700, in some embodiments, one or both of the modules may instead be included in the depth camera 720.

Computing system 700 may be operatively coupled to the depth camera 720. Depth camera 720 may include an infrared light 722 and a depth camera 724 (also referred to as an infrared light camera) configured to acquire video of a scene including one or more human subjects. The video may comprise a time-resolved sequence of images of spatial resolution and frame rate suitable for the purposes set forth herein. As described above with reference to FIG. 3, the depth camera and/or a cooperating computing system (e.g., computing system 700) may be configured to process the acquired video to identify one or more postures and/or gestures of the user, and to interpret such postures and/or gestures as device commands configured to control the depth camera to emit the remote control signals.

Depth camera 720 may include a communication module 726 configured to communicatively couple depth camera 720 with one or more other computing devices. Communication module 726 may include wired and/or wireless communication devices compatible with one or more different communication protocols. In one embodiment, the communication module 726 may include an imaging interface 728 to send imaging information (such as the acquired video) to computing system 700. Additionally or alternatively, the communication module 726 may include a control interface 730 to receive an instruction from computing system 700 causing the infrared light 722 to emit a specific remote control signal. The control and imaging interfaces may be provided as separate interfaces, or they may be the same interface. In one example, control interface 730 and imaging interface 728 may include a universal serial bus.

The nature and number of cameras may differ in various depth cameras consistent with the scope of this disclosure. In general, one or more cameras may be configured to provide video from which a time-resolved sequence of three-dimensional depth maps is obtained via downstream processing. As used herein, the term 'depth map' refers to an array of pixels registered to corresponding regions of an imaged scene, with a depth value of each pixel indicating the depth of the surface imaged by that pixel. 'Depth' is defined as a coordinate parallel to the optical axis of the depth camera, which increases with increasing distance from the depth camera.

In some embodiments, depth camera 720 may include right and left stereoscopic cameras. Time-resolved images from both cameras may be registered to each other and combined to yield depth-resolved video.

In some embodiments, a "structured light" depth camera may be configured to project a structured infrared illumination comprising numerous, discrete features (e.g., lines or dots). A camera may be configured to image the structured illumination reflected from the scene. Based on the spacings between adjacent features in the various regions of the imaged scene, a depth map of the scene may be constructed.

In some embodiments, a "time-of-flight" depth camera may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

Depth camera 720 may include a visible light camera 732 (e.g., color). Time-resolved images from color and depth cameras may be registered to each other and combined to yield depth-resolved color video. Depth camera 720 and/or computing system 700 may further include one or more microphones 734.

While depth camera 720 and computing system 700 are depicted in FIG. 7 as being separate devices, in some embodiments depth camera 720 and computing system 700 may be included in a single device. Thus, depth camera 720 may optionally include computing system 700.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A depth camera, comprising:
an infrared light to emit infrared light at a physical space;
an infrared camera to receive infrared light from the physical space;
an imaging interface to output a depth map derived from the infrared light; and
a control interface to receive an instruction indicating a remote control signal to emit from the infrared light, wherein the infrared light is configured to emit infrared light encoding the remote control signal at the physical space responsive to the control interface receiving the instruction.

2. The depth camera of claim 1, wherein the imaging interface and the control interface are the same interface.

3. The depth camera of claim 1, wherein the imaging interface and the control interface include a universal serial bus.

4. The depth camera of claim 1, wherein the remote control signal mimics a native remote control signal of an external device and is configured to cause the external device to perform an action controlled by the native remote control signal.

5. A method, comprising:
receiving depth map information from a depth camera configured to emit infrared light at a physical space and image reflected infrared light from the physical space;
receiving a device command; and
sending an instruction to the depth camera indicating a remote control signal to emit from the depth camera, the remote control signal configured to cause an external device to perform an action associated with the device command.

6. The method of claim 5, wherein the device command is received from a control device incapable of emitting the remote control signal.

7. The method of claim 5, wherein the depth camera includes an infrared camera and an infrared light, and wherein the instruction indicates the remote control signal to emit from the infrared light.

8. The method of claim 5, wherein the device command is received from a remote computing device or service.

9. The method of claim 5, wherein the device command is received from a skeletal modeling module configured to recognize natural user input gestures physically performed by a user.

10. The method of claim 5, wherein the device command is received from a voice recognition module configured to recognize voice commands issued by a user.

11. The method of claim 5, wherein the device command is received from a hand-held game controller.

12. The method of claim 5, wherein the device command is received from a remote control configured to emit a non-compatible signal.

13. A depth camera, comprising:
an infrared light to emit infrared light at a physical space;
an infrared camera to receive infrared light from the physical space;
an imaging interface to output depth map information derived from the infrared light and useable to construct a depth map including a plurality of pixels, each pixel indicating a distance to a surface in the physical space imaged by that pixel; and
a control interface to receive an instruction indicating a remote control signal to emit from the infrared light, wherein the infrared light is configured to emit infrared light encoding the remote control signal responsive to the control interface receiving the instruction.

14. The depth camera of claim 13, wherein the imaging interface and the control interface are the same interface.

15. The depth camera of claim 13, wherein the imaging interface and the control interface include a universal serial bus.

16. The depth camera of claim 13, wherein the remote control signal mimics a native remote control signal of an external device and is configured to cause the external device to perform an action controlled by the native remote control signal.

\* \* \* \* \*